US008905814B2

(12) United States Patent
Del Castillo

(10) Patent No.: US 8,905,814 B2
(45) Date of Patent: Dec. 9, 2014

(54) ELECTRONIC SPEED CONTROL PROGRAMMING

(71) Applicant: Castle Creations, Inc., Olathe, KS (US)

(72) Inventor: Patrick D. Del Castillo, Olathe, KS (US)

(73) Assignee: Castle Creations, Inc., Olathe, KS (US)

( * ) Notice: Subject to any disclaimer, the term of this patent is extended or adjusted under 35 U.S.C. 154(b) by 0 days.

(21) Appl. No.: 14/186,866

(22) Filed: Feb. 21, 2014

(65) Prior Publication Data

US 2014/0170933 A1 Jun. 19, 2014

Related U.S. Application Data

(60) Continuation of application No. 13/549,149, filed on Jul. 13, 2012, now Pat. No. 8,678,875, which is a continuation of application No. 12/609,909, filed on Oct. 30, 2009, now Pat. No. 8,287,328, which is a division of application No. 11/361,822, filed on Feb. 24, 2006, now Pat. No. 7,740,516.

(60) Provisional application No. 60/656,047, filed on Feb. 24, 2005.

(51) Int. Cl.

| | |
|---|---|
| *A63H 17/395* | (2006.01) |
| *A63H 30/04* | (2006.01) |
| *G06F 9/445* | (2006.01) |
| *H04L 29/08* | (2006.01) |

(52) U.S. Cl.
CPC *A63H 30/04* (2013.01); *G06F 8/65* (2013.01); *H04L 67/34* (2013.01); *H04L 67/12* (2013.01)
USPC .......................... 446/436; 446/484; 446/491

(58) Field of Classification Search
USPC .......................................... 446/436, 456, 454
See application file for complete search history.

(56) References Cited

U.S. PATENT DOCUMENTS

| | | | | |
|---|---|---|---|---|
| 4,964,837 | A * | 10/1990 | Collier | 446/409 |
| 6,293,798 | B1 * | 9/2001 | Boyle et al. | 434/29 |
| 6,842,804 | B2 * | 1/2005 | Cloud et al. | 710/69 |
| 6,949,002 | B2 * | 9/2005 | Yamaguchi et al. | 446/454 |
| 7,107,196 | B2 * | 9/2006 | Waterston | 703/8 |
| 2002/0187726 | A1 * | 12/2002 | Yamaguchi | 446/454 |
| 2003/0167345 | A1 * | 9/2003 | Knight et al. | 709/249 |
| 2005/0119051 | A1 * | 6/2005 | Ko | 463/37 |

OTHER PUBLICATIONS

Castle Creations, Phoenix-80 manual, Mar. 19, 2003, pp. 1-6.*

* cited by examiner

*Primary Examiner* — Tramar Harper
(74) *Attorney, Agent, or Firm* — Shook, Hardy & Bacon L.L.P.

(57) ABSTRACT

A method and apparatus for programming an electronic speed controller for a radio controlled model including a programmer for interfacing a personal computer to the RX port of the electronic speed controller. The electronic speed controller software may be updated, modified or replaced through the RX port.

20 Claims, 2 Drawing Sheets

ELECTRONIC SPEED CONTROL PROGRAMMING

CROSS-REFERENCE TO RELATED APPLICATIONS

This application is a continuation of application Ser. No. 13/549,149, filed Jul. 13, 2012, which is a continuation of U.S. Pat. No. 8,287,328 (application Ser. No. 12/609,909), filed Oct. 30, 2009, entitled ELECTRONIC SPEED CONTROL PROGRAMMING, which is a divisional of nonprovisional U.S. Pat. No. 7,740,516 (application Ser. No. 11/361,822) filed Feb. 24, 2006, entitled ELECTRONIC SPEED CONTROL PROGRAMMING, which claims the benefit of U.S. provisional Application Ser. No. 60/656,047 filed on Feb. 24, 2005. Application Ser. No. 13/549,149, U.S. Pat. No. 8,287,328, U.S. Pat. No. 7,740,516, and Application Ser. No. 60/656,047 are all hereby incorporated by reference in their entirety.

FIELD OF THE INVENTION

The present invention relates to a method and apparatus for programming an electronic speed control and, more particularly, to a method and apparatus for programming an electronic speed control through an RX receive control port.

BACKGROUND OF THE INVENTION

Radio controlled models, such as airplanes, helicopters, boats and cars, are known in the art. Battery-powered RC models include a battery, a direct current (DC) motor, a radio receiver, and an electronic speed control. Electronic speed controls for DC motors typically include a microprocessor with a memory or firmware. Most electronic speed controls are preprogrammed at the manufacturer for a particular application and with a fixed set of instructions or functions. These electronic speed controls typically have no means for reprogramming the memory. Other electronic speed controls may include programmable memory such as EEPROM or flash memory and a dedicated programming port to enable updating of the software functions or to correct programming errors.

SUMMARY OF THE INVENTION

The present invention provides a method and apparatus for reprogramming an electronic speed control ("ESC") through the receive ("RX") port of an electric radio controlled model vehicle.

DETAILED DESCRIPTION

Figure 1:
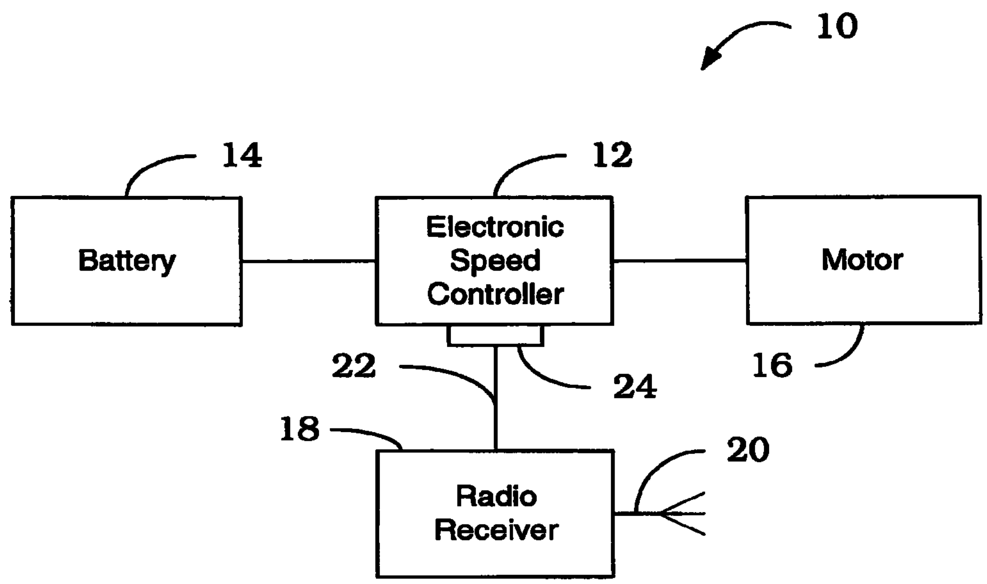
FIG. 1 is a functional block diagram of a radio controlled model control circuit.

Referring to FIG. 1, a block diagram of a radio controlled model control circuit is generally indicated by reference numeral 10. RC model control circuit 10 includes an electronic speed controller (ESC) 12, a power supply such as a battery 14, a DC motor 16 a radio receiver circuit 18 and an antenna 20. Radio receiver 18 is connected to the electronic speed controller 12 through line 22 and connector 24. In a typical application, the components of the radio controlled model control circuit 10 are mounted in a radio controlled model such as an airplane, for example. The antenna 20 and receiver 18 receive control commands from a transmitter (not shown) under the control of a user, and transmit the commands to the electronic speed controller 12 via line 22 through a three-pin connector 24. Electronic speed controller 12 includes a microprocessor, program memory and associated electronic components (not shown). In response to commands received from the receiver 18, the electronic speed controller 12 applies power from battery 14 to DC motor 16. Electronic speed controller 12 controls the timing and duration of voltage pulses applied to the DC motor 16 as necessary in response to the commands sent from the transmitter.

Figure 2:
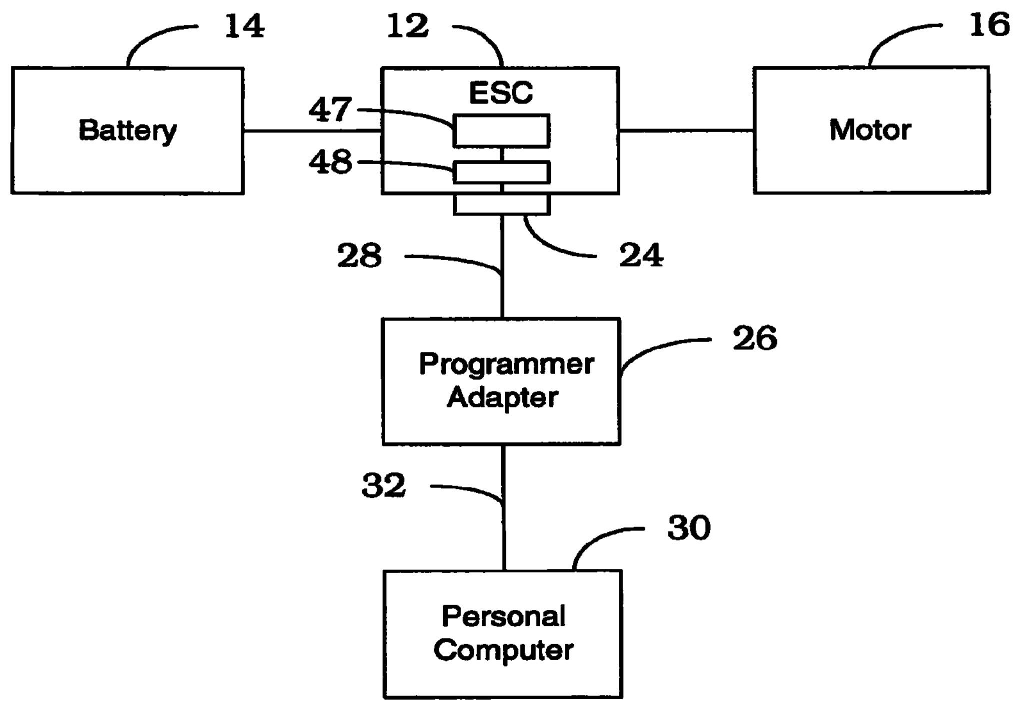
FIG. 2 is a functional block diagram of an electronic speed control circuit interfaced with a programmer.

Referring to FIG. 2, a programmer adapter 26 may be connected to the electronic speed controller 12 using the same connector 24 and an adapter cable 28 to reprogram the electronic speed controller 12, discussed in detail hereinbelow. Programmer 26 may connect to a USB or serial port, for example, on a personal computer 30 via cable 32.

Figure 3:
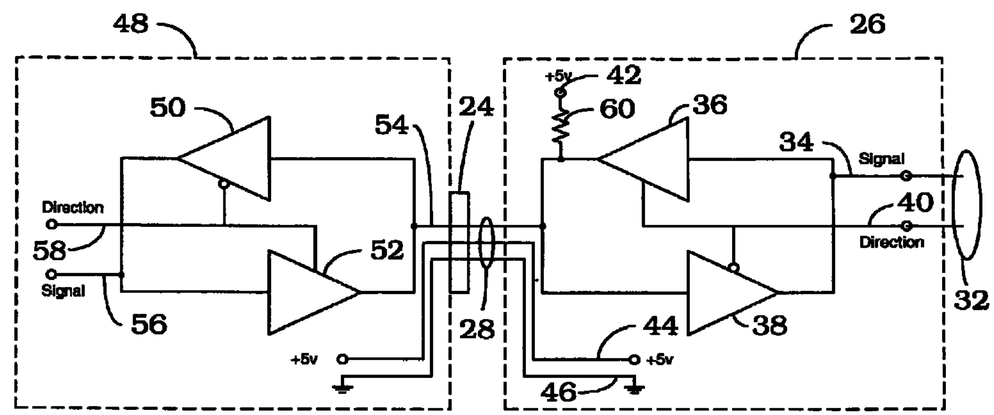
FIG. 3 is a circuit diagram of the ESC programmer interface.

In greater detail referring to FIGS. 2 and 3, programmer 26 includes a bi-directional signal line 34 connected to a send buffer 36 and a receive buffer 38. A directional signal line 40 is connected to each of the buffers 36 and 38 to enable or disable the respective buffer. Power on lines 42 and 44 and ground on line 46 may be provided through the USB cable 32 from the USB port on the personal computer 30, or may be supplied by the battery 14 connected to ESC 12, for example.

The electronic speed controller 12 includes a microprocessor 47, and an ESC interface 48. The ESC interface 48 includes a buffer circuit similar to the buffer circuit for the programmer 26. A receive buffer 50 and a send buffer 52 are connected to a bidirectional signal line 54 from programmer 26 and a signal line 56 from the microprocessor 47. A direction signal line 58 is connected to each of the buffers 50 and 52 to enable or disable the respective buffer.

To reprogram the firmware in the ESC 12, the battery 14 may be disconnected from the ESC 12. The programmer 26 is connected to a USB or serial port of computer 30 with cable 32. Cable 28 is then connected to connector 24 of the ESC 12.

When power is applied to the ESC 12 on line 44, the ESC 12 determines the function of the port 24, i.e., whether it is connected to the receiver 18 or connected to the programmer 26. If the signal on line 54 is an activation signal such as a consistent high voltage, then the ESC 12 is connected to the programmer 26 and will enter a programming mode. The consistent high level is generated by the pull-up resistor 60 on line 42 and connected to line 54. If a high voltage signal is not detected by the ESC 12 on line 54, then the ESC 12 is connected to the receiver 18 and will use the port 24 as a normal, unidirectional RX port by setting the direction line 58 on the ESC 12 low. The power 44 and ground 46 lines through the RX port 24 are used to power the ESC 12 and set a consistent ground level.

Once the ESC 12 enters the programming mode, the signal line 54 is treated as a single wire bidirectional bus. The PC 30 initiates all communications with the ESC 12 through the programmer 26. Either the ESC 12 or the programmer 26 may put data on line 54 by actively pulling it to ground to indicate a low signal or by going into a high-Z state and allowing the pull-up resistor 60 on line 42 to pull the line 54 to a high signal level. Because there is no common clock signal between the ESC 12 and the PC 30, data is input on line 54 and read from line 54 in a predetermined sequence. The PC 30 is responsible for negotiations and control of the ESC 12.

Communication over the bus 54 is accomplished using data packets. All packets begin with a synchronization start field, followed by a packet identifier. The packet identifier indicates the type of packet such as a token, data or handshake, for example. An address field specifies the function, via its address, that is either the source or destination of a data packet, followed by the endpoint field. A data field includes an integral number of bytes depending on the packet identifier. A cyclic redundancy check or checksum field is used to ensure that the data is transmitted and received correctly.

When power is detected by the ESC 12 on line 54, the ESC 12 sends out a start or connect byte of data on line 54 and waits for a response from PC 30. If a response is not received within a predetermined amount of time, such as 10 milliseconds for example, the ESC 12 sends another byte of data on line 54. This continues until the PC 30 responds or a maximum number of retries is exceeded, for example.

More particularly, when the programmer 26 is initially connected to the ESC 12 through RX port 24, the PC 30 waits to receive the start or connect byte from the ESC 12. Once the start or connect byte is received, the PC 30 sends a 16-byte data packet to the ESC 12.

Typically, the first data packet includes instructions to reprogram or update the communication software on the ESC 12, for example. Once the task is completed, the ESC 12 sends an acknowledgment along with a checksum. If the checksum is incorrect, the PC 30 ignores the response from the ESC 12 and sends the same data packet again.

Once the communication software in the ESC 12 is updated, if necessary, the motor controller software may be updated. Some of the commands that may be sent from the PC 30 to the ESC 12 include Erase Flash to erase the contents of the flash memory beginning at a specified memory address and Program Flash to program the flash memory with program data beginning at a specified memory address, for example.

Using the RX port 24 and programmer 26 interface, program parameters or settings stored in the firmware on the ESC 12 may be modified using software loaded on the personal computer 30. Parameters such as the cutoff voltage, cutoff type, brake type, throttle type, soft start, motor settings, current, pulse frequency and rotation direction may be modified or adjusted, for example.

User upgradeable firmware on the ESC 12 allows the user to incorporate product improvements into existing controllers without returning the controller to the manufacturer or purchasing another controller. The user may add new functionality to the controller for a specific application or may reconfigure the controller for another application and use such as changing from airplane firmware to helicopter or race car firmware, for example. Additionally, bug fixes and upgrades may be easily, quickly and inexpensively distributed to end users.

Figure 4:
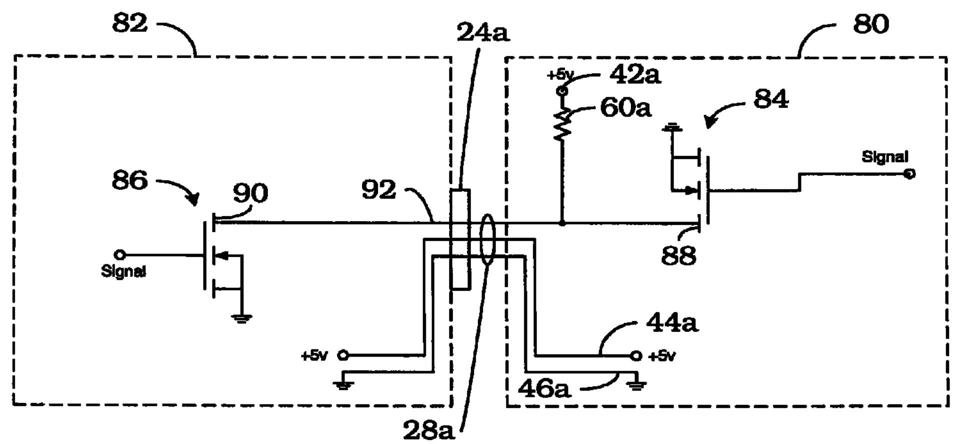
FIG. 4 is a circuit diagram of another embodiment of the ESC programmer interface.

Referring to FIG. 4, another embodiment of an ESC programmer interface circuit is illustrated. In both the programmer 80 and ESC 82, a MOS FET transistor 84 and 86, respectively, each with an open drain output 88 and 90, respectively, is used to drive an RX signal line 92. Components corresponding in function to components designated in FIGS. 1-3 are designated with the same reference numerals with the addition of the "a" notation. As described hereinabove for line 54, line 92 is a bidirectional bus for communication between the ESC 12 and the PC 30.

It should be understood that while certain forms of this invention have been illustrated and described, it is not limited thereto except insofar as such limitations are included in the following claims.

Having thus described the invention, what is claimed as new and desired to be secured by Letters Patent is as follows:

1. An apparatus for controlling speed of a battery-powered motor-driven radio controlled vehicle, the apparatus comprising:

a microprocessor having a memory;

a power interface coupled to the microprocessor;

a motor interface coupled to the microprocessor;

a motor controller software contained in the memory and configured to apply power over the motor interface by controlling the timing and duration of voltage pulses;

a dual-use connector coupled to the microprocessor, wherein the dual-use connector is removably coupleable to a first radio controlled vehicle component in a first configuration condition, and wherein the dual use-connector is removably coupleable to a programming cable in a second configuration condition to activate a programming mode;

a programming update software contained in the memory and configured to receive update parameters for the motor controller software contained in the memory, wherein the update parameters are received when the dual-use connector is in the second configuration; and a port determination software contained in the memory that is configured to monitor one or more signals present on the dual-use connector and to determine, based on the one or more signals, that the dual use-connector is removably coupled to the programming cable in the second configuration condition.

2. The Apparatus of claim 1, wherein the first radio controlled vehicle component is a motor.

3. The apparatus of claim 2, wherein the microprocessor receives information from the first radio controlled vehicle component in the first configuration condition.

4. The apparatus of claim 1, wherein the programming update software receives and transmits over a bidirectional line within the dual-use connector.

5. The apparatus of claim 1, wherein the update parameters comprise one or more of soft start, throttle type, brake type, motor settings, pulse frequency, and rotation direction.

6. The apparatus of claim 1, wherein in the second configuration condition the programming cable is connected to a personal computer that is separate from the radio controlled vehicle.

7. The apparatus of claim 6, wherein the update parameters are received from the personal computer.

8. The apparatus of claim 1, wherein update parameters are firmware data comprising program parameters.

9. The apparatus of claim 1, wherein update parameters are firmware data comprising product improvement firmware.

10. The apparatus of claim 1, wherein update parameters are firmware data comprising firmware with new functionality.

11. The apparatus of claim 1, wherein the first radio controlled vehicle component is a radio.

12. The apparatus of claim 1, wherein the first radio controlled vehicle component is a battery.

13. An apparatus for controlling movement of a battery-powered motor-driven radio controlled vehicle, the apparatus comprising:

a microprocessor having a memory;

a motor interface coupled to the microprocessor;

a control software contained in the memory and configured to control movement of the radio controlled vehicle;

a dual-use connector coupled to the microprocessor, wherein the dual-use connector is removably coupleable to a first radio controlled vehicle component in a first configuration condition, and wherein the dual use-connector is removably coupleable to a programming cable in a second configuration condition to activate a programming mode;

a programming update software contained in the memory and configured to receive update parameters for the control software contained in the memory, wherein the update parameters are received when the dual-use connector is in the second configuration; and a port determination software contained in the memory that is configured to monitor one or more signals present on the dual-use connector and to determine, based on the one or more signals, that the dual use-connector is removably coupled to the programming cable in the second configuration condition.

14. The Apparatus of claim 13, wherein the first radio controlled vehicle component is a motor.

15. The apparatus of claim 14, wherein the microprocessor receives information from the first radio controlled vehicle component in the first configuration condition.

16. The apparatus of claim 13, wherein in the second configuration condition the programming cable is connected to a personal computer that is separate from the radio controlled vehicle.

17. The apparatus of claim 16, wherein the update parameters are received from the personal computer.

18. A method for controlling a radio controlled vehicle having a battery, a motor, and an electronic speed controller located in the radio controlled vehicle, wherein the electronic speed controller comprises a microprocessor, the method comprising:

storing firmware data within memory of the microprocessor;

monitoring a dual-use connector coupled to the microprocessor, wherein the dual-use connector is removably coupleable to the electronic speed controller in a first configuration condition, and wherein the dual use-connector is removably coupleable to a programming cable in a second configuration condition to activate a programming mode;

determining a signal is present on the dual-use connector indicating a programming mode;

communicating through the dual-use connector in the second configuration condition to receive replacement data;

updating the firmware data using the replacement data; and applying power received from the battery to the motor of the radio controlled vehicle utilizing the replacement data by controlling timing and duration of voltage pulses.

19. The method of claim 5, wherein the firmware data comprises product improvement firmware.

20. The method of claim 5, wherein the firmware data comprises firmware with new functionality.

* * * * *